G. W. BOWERS.
SQUARE.
APPLICATION FILED MAY 28, 1912.
1,073,089.
Patented Sept. 16, 1913.
2 SHEETS—SHEET 1.
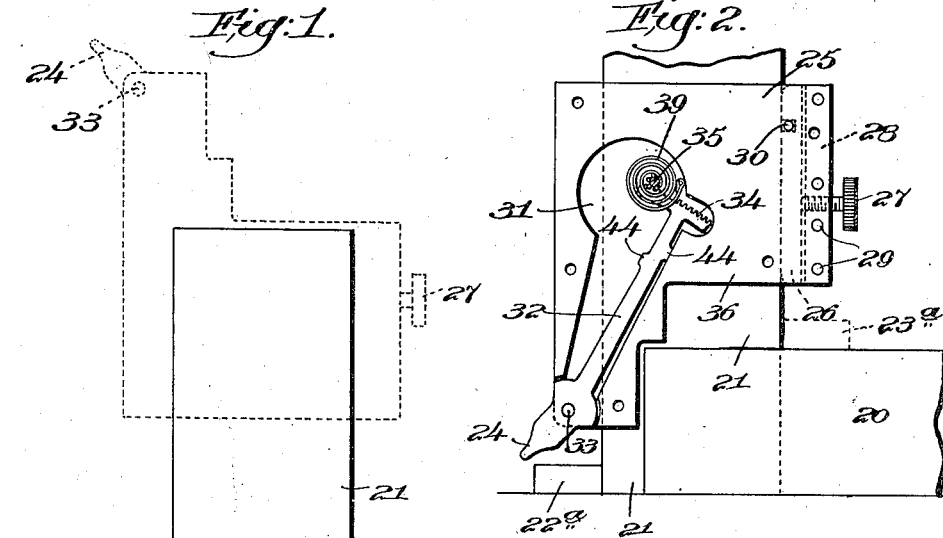
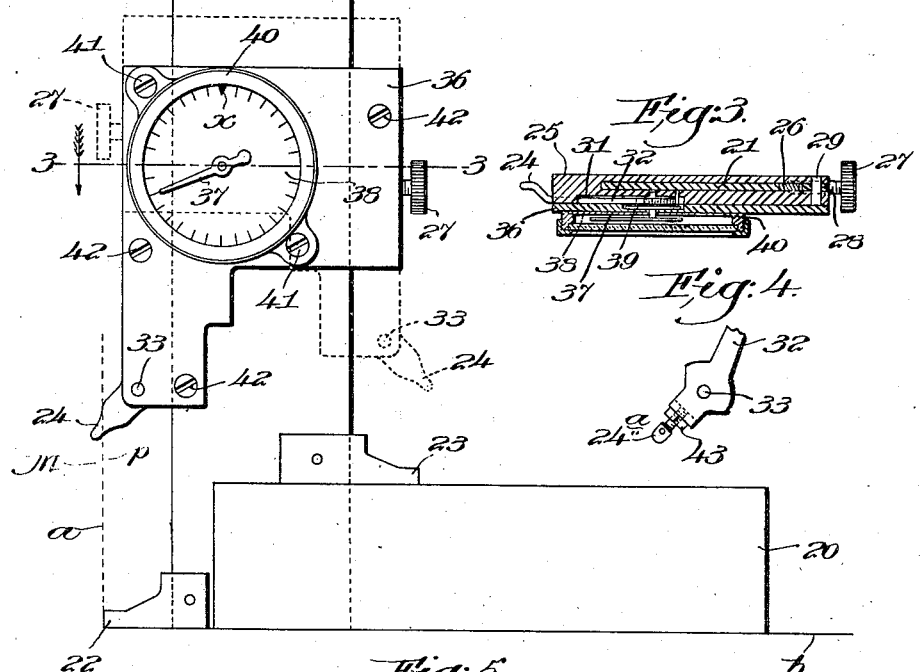
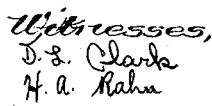
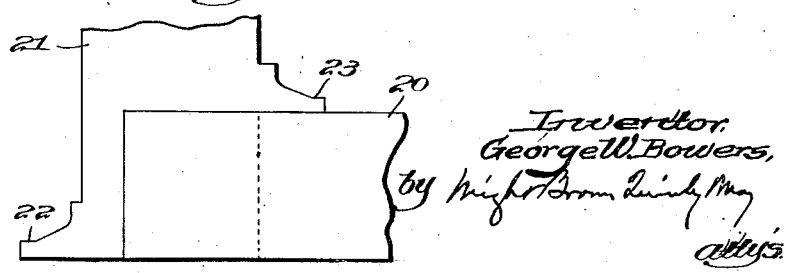

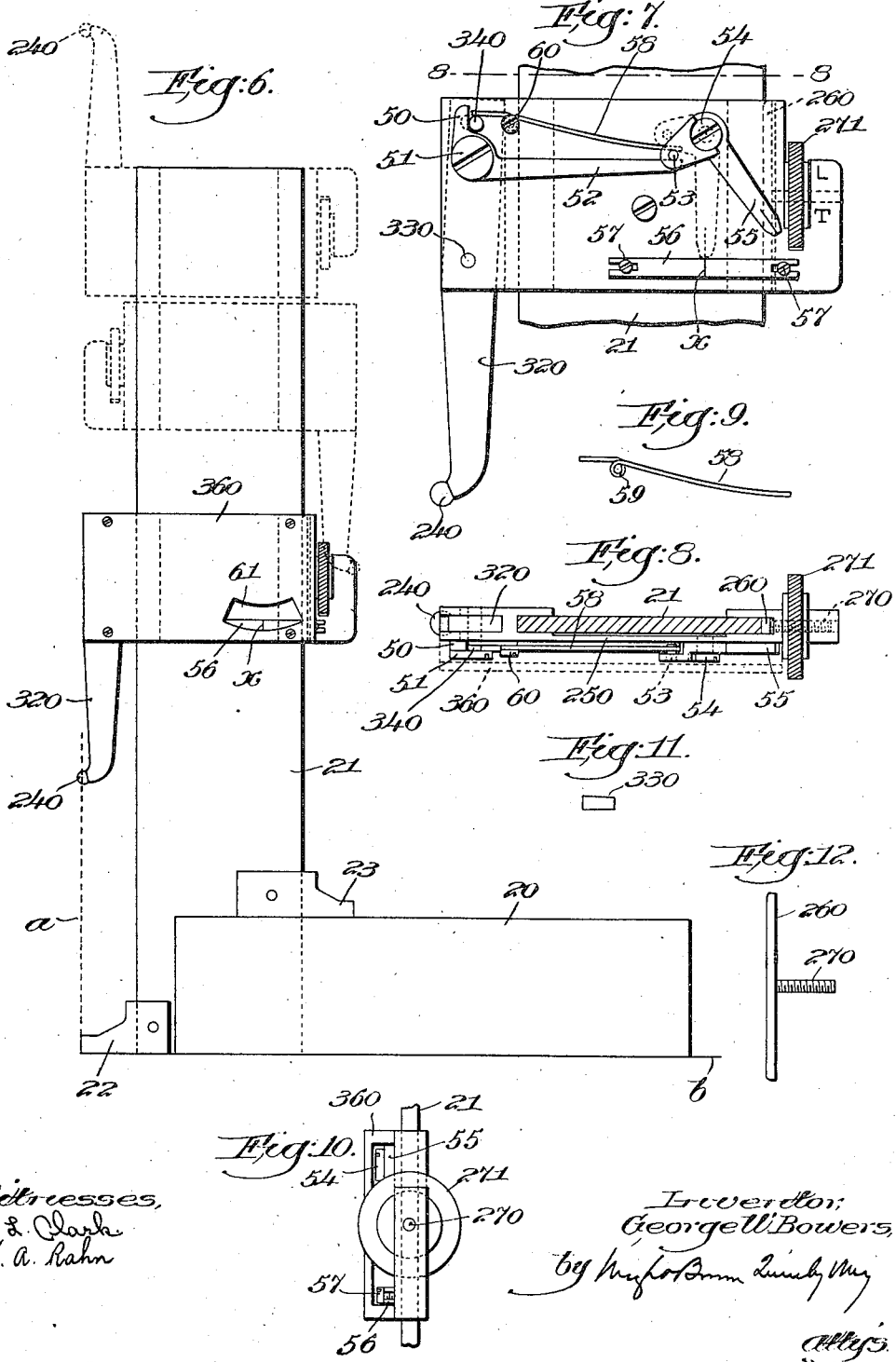

UNITED STATES PATENT OFFICE.

GEORGE W. BOWERS, OF SOMERVILLE, MASSACHUSETTS.

SQUARE.

1,073,089.

Specification of Letters Patent.   Patented Sept. 16, 1913.

Application filed May 28, 1912.   Serial No. 700,203.

*To all whom it may concern:*

Be it known that I, GEORGE W. BOWERS, a citizen of the United States, and a resident of Somerville, in the county of Middlesex and State of Massachusetts, have invented certain new and useful Improvements in Squares, of which the following is a specification.

This invention relates to measuring instruments of the type employed for determining the accuracy of angles, such instruments being sometimes of a form commonly called "try squares."

With the ordinary square used for testing the angles formed by two surfaces supposed to be at right angles with each other, the determining angular edges of the square, even if at accurate right angles with each other, cannot be employed to determine the accuracy of the two surfaces of the article to be measured excepting within such limits as may be determined by the power of the human eye to note the transmission of the light between the edges of the square and the surfaces to be measured.

The object of the present invention is to provide an improved instrument of this character which will enable the accuracy of the angles of the surfaces to be measured to an unquestionable determination without relying upon the transmission of light between the edges of the instrument and the surfaces of the article.

To these ends the invention consists in the square having two bearing points to contact with one of the angular surfaces of the article to be measured or tested, one of said bearing points being movably connected with the body of the square, means being employed to determine the extent of movement of said movable bearing point.

The invention further consists in the improvements which I will now proceed to describe and claim.

Of the accompanying drawings:—Figure 1 is an elevation of my improved square, indicating various adjustments by dotted lines. Fig. 2 is a detail elevation with the front plate of the slide removed, said figure also illustrating a modification hereinafter referred to. Fig. 3 represents a section on line 3—3 of Fig. 1. Fig. 4 is a detail view of a modification of one of the bearing points. Fig. 5 is a detail view of a modified form of the body of the square. Fig. 6 is a view similar to Fig. 1 illustrating a modified construction of the slide and indicator. Fig. 7 is a detail view of the slide mechanism shown in Fig. 6, on a larger scale and with the front plate removed. Fig. 8 represents a section on line 8—8 of Fig. 7. Fig. 9 is a detail view of the spring shown in Fig. 7. Fig. 10 is an elevation from the right of Fig. 7. Fig. 11 is a detail elevation of the pivot pin for the lever or rocking arm shown in Fig. 7. Fig. 12 is a detail view of the frictional gib and its screw.

The same reference characters indicate the same parts in all the figures.

Referring first to Figs. 1, 2 and 3, the body of the square comprises a beam 20 and blade 21, it being understood that either the under surface or the top surface of the beam 20 is to be employed to contact with one surface of the article to be tested.

In the embodiment of the invention shown in Fig. 1, there is a toe 22 projecting laterally from the angle of the square, and rigidly connected thereto as by a rivet passing either through an edge portion of the blade 21 or through a portion of the beam 20. This toe 22 forms one of the bearing points to contact with a portion of one of the surfaces of the article to be tested, such surface being indicated by the dotted line $a$ when the base of the beam 20 is bearing against a surface $b$ of the article to be tested. Another toe 23 is secured at the inner angle of the square, the purpose of which will be hereinafter described. Mounted on the blade 21 is a slide carrying an indicator, the position of which is affected by a movable bearing point or toe 24, the mechanism as will be presently described, being such that if the surface $a$ is not accurately at a right angle with the surface $b$, the indicator will show at either the minus or plus side of the zero or test point, how much out of true angularity the surface $a$ is in relation to the surface $b$.

The body 25 of the slide is milled out or otherwise formed, as indicated in Fig. 3, to receive the blade 21. In order that said slide may be held at any desired point lengthwise of the blade 21, I provide a gib 26 which is adapted to be pressed by means of a screw 27 having a milled head, against one edge of the blade 21. A strip 28 is secured as by suitable rivets 29 between the front and rear surfaces of the body 25 formed by milling out the passage way for the blade 21, there being a slight space provided between the strip 28 and gib 26 to permit the necessary movement of the gib in order to release or clamp the slide. To hold the gib in position, it is provided with a notch indicated by dotted lines in Fig. 2, a pin 30 extending into said notch. Preferably the upper and lower ends of the inner edge of the gib 26 are slightly round or curved, as indicated by dotted lines in Fig. 2, to facilitate the placing of the slide on to the end of the blade 21 when assembling in either one of the various positions for said slide hereinafter described.

The body of the slide is cut away as at 31 to provide a space for an arm 32 pivoted at 33, the lower end of said arm which projects outwardly from the slide constituting a movable toe 24. The other end of the arm 32 is formed or provided with a toothed sector 34 which meshes with a pinion on an arbor 35 suitably mounted in the slide and in the cover plate 36, the outer end of said arbor having a pointer 37 adapted to coöperate with a dial 38 secured to the outer face of the cover plate 36. A hair spring 39 is employed to insure accuracy of movement of the pointer under the control of the arm 32 and its sector 34. The dial is held in place by a ring 40 secured to the cover plate 36 as by screws 41. Said ring 40 is shown as carrying a bezel and crystal to protect the pointer 37 but permitting it and the graduations on the dial to be seen. In practice, the dial may be graduated to indicate one-thousandth of an inch or less. The cover plate 36 is secured to the body of the slide as by screws 42, and also by the screws 41.

By means of the screw 27 the slide may be set at any point along the length of the blade 21 according to the size of the surface $a$, and the distance at which it is desired that the movable toe or bearing point 24 shall be from the toe 22. In Fig. 1 the toe 24 is shown as crossing the dotted line $a$, because in said figure the said toe 24 is supposed to occupy its normal position under the influence of spring 39; said normal position being also shown in Fig. 2. If, however, the square is to be used to test the accuracy of the angular relationship of the surfaces $a$ and $b$, the placing of said square in position relatively to said surfaces in the same manner in which the ordinary square is used, will result in the toe 24 being moved in such a direction that the toothed sector 34 will rotate the pointer toward the zero point indicated at $x$ in Fig. 1. The structure and adjustment of the parts are such that if the surfaces $a$ and $b$ are accurately at right angles with each other, the pointer 37 will be stopped at zero. If said surfaces $a$ and $b$ are not accurately at right angles with each other, the pointer 37 will indicate plus or minus according to whether the angle of the surfaces $a$ and $b$ is obtuse or acute, and the amount of the obtuseness or acuteness will be accurately indicated by the pointer 37. It will be readily understood that it is much easier to perform this testing operation, by reading the indications of the pointer, than by relying upon the transmission of light rays between the edge portions of the square and the surfaces being tested. In Fig. 1, dotted lines indicate two other positions that may be given to the slide relatively to the blade 21, other than the mere adjustment of the slide lengthwise of the blade. The lower dotted lines of Fig. 1 indicate how the slide may be mounted as by sliding it off from the blade 21, turning it one-half way around, and returning it with the toe 24 projecting inwardly over the toe 23. This is to enable the instrument to be used to determine the accuracy of the angularity of two external faces of an article bearing with one face against the upper surface of beam 20 and with another face bearing against the tip of toe 23. The operation will then be the same as already described, excepting that the toe 24 coöperates with the toe 23 instead of with the toe 22 in determining the accuracy of the angle of the side face of the angle to be tested relatively to the under surface of such article.

If the height of the side face of the article be greater than could be tested if the slide were moved upwardly as far as possible along the blade 21 and while said slide is in position shown by full lines in Fig. 1, then the slide can be removed and turned one-half way over vertically so as to enable the toe 24 to occupy the position shown by dotted lines at the extreme top of Fig. 1.

With the construction shown in Figs. 1, 2 and 3 it may be necessary sometimes to adjust the dial relatively in order to locate the zero point properly. Instead of doing this, however, I may make the movable bearing point adjustable. This may be effected, as indicated in Fig. 4 by constructing the bearing point as a screw, the head 24ª of which is to bear against the surface to be measured, said screw being tapped into the lever or arm 32 and secured in adjusted position by a jam nut or lock nut 43.

To provide means for accurately determining the normal position of the arm 32 and to limit the distance to which said arm can be moved away from normal position, said arm is provided with projections 44 adapted to contact with the walls of the recess or cut away portion 31.

The toes 22 and 33 need not be separate pieces riveted in position, but may be integral with the blade 21, as shown in Fig. 5.

The structure illustrated in Figs. 6 to 11 inclusive provides a slide and indicator different from that shown in Figs. 1, 2 and 3. In this modified form the slide comprises a body 250 milled out to provide ways for the edges of the blade 21, as best shown in Fig. 8. A gib 260 (Figs. 7, 8 and 12) is provided with a screw 270 extending across a recess formed in a projecting portion of the body of the slide. A milled nut 271 is mounted on the screw 270 so that owing to the engagement of the nut with the walls of the recess in which it is mounted said nut may be utilized for adjusting the gib 260 to cause it to frictionally bind against the edge of the blade 21. The projection shown in Fig. 7 is provided with indications such as the letters "L" "T" to indicate which way to turn the nut 271 to loosen or tighten the gib. The other edge of the body of the slide is milled out to receive an arm 320 pivotally supported on a taper pin 330 and having a toe 240. The pivot pin 330 is tapered as shown in Fig. 11 so that it may be driven tightly into either the hole provided therefor in the arm 320 or in the hole or holes formed in the body of the slide. The upper end of the arm 320 is provided with a pin 340 which projects through a laterally elongated hole in the side of the body of the slide, said pin 340 engaging the short arm 50 of a lever pivoted at 51 and having a long arm 52, the outer end of which extends under a pin 53, carried by a short arm of an elbow lever pivoted at 54 to the body of the slide and having a longer arm 55 which constitutes a pointer. The extreme end of the pointer arm 55 may be provided with a scored or otherwise formed mark to coöperate with the zero point $x$ carried by a scale strip 56. In order that said scale strip may be adjusted in its position, its ends may be, as shown in Fig. 7, provided with slots through which screws 57 pass into the body of the slide. A spring 58 (Figs. 7 and 9) is provided with an eye 59 mounted on a pivot pin or screw 60, and the short end of the said spring bears upon the pin 340 while the longer end bears upon the pin 53 and causes the latter to follow all movements of the lever arm 52. A cover plate 360 shown by full lines in Figs. 6 and 10 and indicated by dotted lines in Fig. 8, is secured to the body of the slide by any suitable means such as by screws. It is provided with a sight opening 61 through which the end of the pointer arm 55 may be seen, and its position relatively to the scale strip 56 determined. As indicated in Fig. 6 by the several different dotted lined positions of the slide and indicator relatively to the blade 21, the use of this device is practically the same as has been described in connection with Fig. 1. The coöperation of the several toes with the portions of the work to be tested will be the same as described in connection with Fig. 1, but instead of a circular dial and a pointer actuated by a toothed sector, the pointer arm 55 is actuated to a position that may be plus or minus relative to the zero point $x$ through the arm 320, its pin 340, the arms 50, 52 of the intermediate lever, and the pin 53 and spring 58. Practically the use and operation of this structure of the square will be the same as that illustrated in Figs. 1 and 2.

Instead of providing toes 22, 23 as shown in Figs. 1, 5 and 6, I may employ separate, detached test blocks such as indicated in Fig. 2. With such structure an angle or a square of ordinary construction may have the indicator slide mechanism applied to its member 21, and then the user can interpose a test block $22^a$ of any preferred form but of proper dimension, or may interpose the same or a similar test block such as indicated by dotted lines at $23^a$, and then employ the instrument in the manner described in connection with Fig. 1.

While I have illustrated the invention as an attachment for, or as a part of an instrument commonly known as a "square," it is to be understood that the members 20, 21, or their equivalents, may be at any other than a right angle, so as to constitute "an angle" instrument.

Whether the instrument is termed a "square" or an "angle", it comprises a beam and a blade as explained. The toe 22 or the toe 23, whether a fixed or separate projection or test block, constitutes a stop which determines or limits the testing position of the bottom of the article that is being measured or tested longitudinally of the beam. Such stop device is essential for the reason that, if absent, an article the two sides of which were at an angle more obtuse than the degree of angle provided for by the beam and blade could not be accurately tested.

I claim:

1. A square for determining the accuracy of angles between plane surfaces, comprising a beam and a blade the blade being at one end of the beam and the two at right angles to each other, the beam having a plane surface to contact with one of the two surfaces the angle between which is to be tested, a stop to contact with a portion of the other of said two surfaces, a bearing point supported on the blade to contact with another portion of the surface which receives the contact of said stop, and an indicator operatively connected with said bearing point.

2. An instrument for determining the accuracy of angles between plane surfaces, said instrument comprising two relatively rigid members at an angle to each other, two projections extending beyond the edge of one of said members, to contact with one of the two surfaces the angle between which is to be tested, one of said projections being movable toward and from said edge and the other projection having its tip at a fixed distance from said edge, and an indicator operatively connected with said movable projection.

3. An instrument for determining the accuracy of angles between plane surfaces, said instrument comprising two relatively rigid members at an angle to each other, two projections extending beyond the edge of one of said members, to contact with one of the two surfaces the angle between which is to be tested, one of said projections being movable toward and from said edge and the other projection having its tip at a fixed distance from said edge, and an indicator operatively connected with said movable projection, and means slidably mounted on the blade and carrying said movable projection and indicator.

4. An instrument for determining the accuracy of angles between plane surfaces, said instrument comprising two relatively rigid members at an angle to each other, two projections extending beyond the edge of one of said members, to contact with one of the two surfaces the angle between which is to be tested, a slide mounted on one of the members of the instrument and carrying one of said projections, the projection carried by said slide being movable toward and from said edge and the other projection having its tip at a fixed distance from said edge, and an indicator carried by said slide and operatively connected with the movable projection.

In testimony whereof I have affixed my signature, in presence of two witnesses.

GEORGE W. BOWERS.

Witnesses:
A. W. HARRISON,
P. W. PEZZETTI.